United States Patent [19]
Anderson

[11] 3,834,728
[45] Sept. 10, 1974

[54] VEHICLE OCCUPANT RESTRAINING DEVICE

[75] Inventor: Carroll C. Anderson, Dearborn Heights, Mich.

[73] Assignee: Ford Motor Company, Dearborn, Mich.

[22] Filed: Oct. 8, 1971

[21] Appl. No.: 187,721

[52] U.S. Cl. ............................................ 280/150 B
[51] Int. Cl. ............................................ B60r 21/02
[58] Field of Search .................... 280/150 B, 150 R

[56] References Cited
UNITED STATES PATENTS
2,977,137   3/1961   Graham .......................... 280/150 B
3,633,936   10/1970  Huber ............................. 280/150 B FOREIGN PATENTS OR APPLICATIONS
1,923,312   11/1970  Germany ........................ 280/150 B
1,358,956   3/1964   France ............................ 280/150 B Primary Examiner—Robert R. Song
Attorney, Agent, or Firm—Keith L. Zerschling; Roger E. Erickson

[57] ABSTRACT

A device to restrain or limit the forward displacement of a passenger in an automobile vehicle seat. The device includes a padded member which may be adjustably positioned in front of the passenger so that upon forward displacement of the passenger the member is engageable with the waist and chest of the passenger. The pad has concavely contoured sides that permit substantially full accessibility of a driver-passenger to controls in front of the padded member. An adjustable articulated support connects the padded member to the body of the automotive vehicle.

2 Claims, 2 Drawing Figures

INVENTOR.
Carroll C. Anderson
BY Keith L. Zerschling
Roger L. Erickson
ATTORNEYS.

VEHICLE OCCUPANT RESTRAINING DEVICE

BACKGROUND AND SUMMARY OF THE INVENTION

Numerous occupant restraint devices have been proposed in the prior art including several adjustably mounted padded members which are positionable in front of a vehicle occupant to restrain or limit his forward displacement. Known padded member restraint devices are primarily of two types: either engagable with the waist and chest of the occupant but not suitable for use by the vehicle operator, or engagable only with the occupant's waist and useable by the vehicle operator.

This invention provides a device to restrain or limit the forward displacement of a seated vehicle occupant which may be used by a vehicle operator without substantially limiting the operator's accessibility to forwardly mounted controls. Furthermore, the invention provides an articulated support structure permitting the restraining device to be adjustably positioned in front of the seated occupant and to be displaced to permit ease of entry into and egress from the vehicle. Still further, the invention provides an effective occupant restraining device which is economical to manufacture, simple and reliable in operation and adaptable for use in a conventional automotive vehicle.

A vehicle occupant restraint device constructed in accordance with this invention includes a padded member having a first portion engagable with the chest of occupant and a second portion engagable with the waist of the passenger. An articulated support secures the padded member to the body of the vehicle. Preferably, the padded member has concavely contoured sides to permit greater accessibility to the forwardly mounted controls or the like.

DETAILED DESCRIPTION OF A PREFERRED EMBODIMENT

Figure 1:
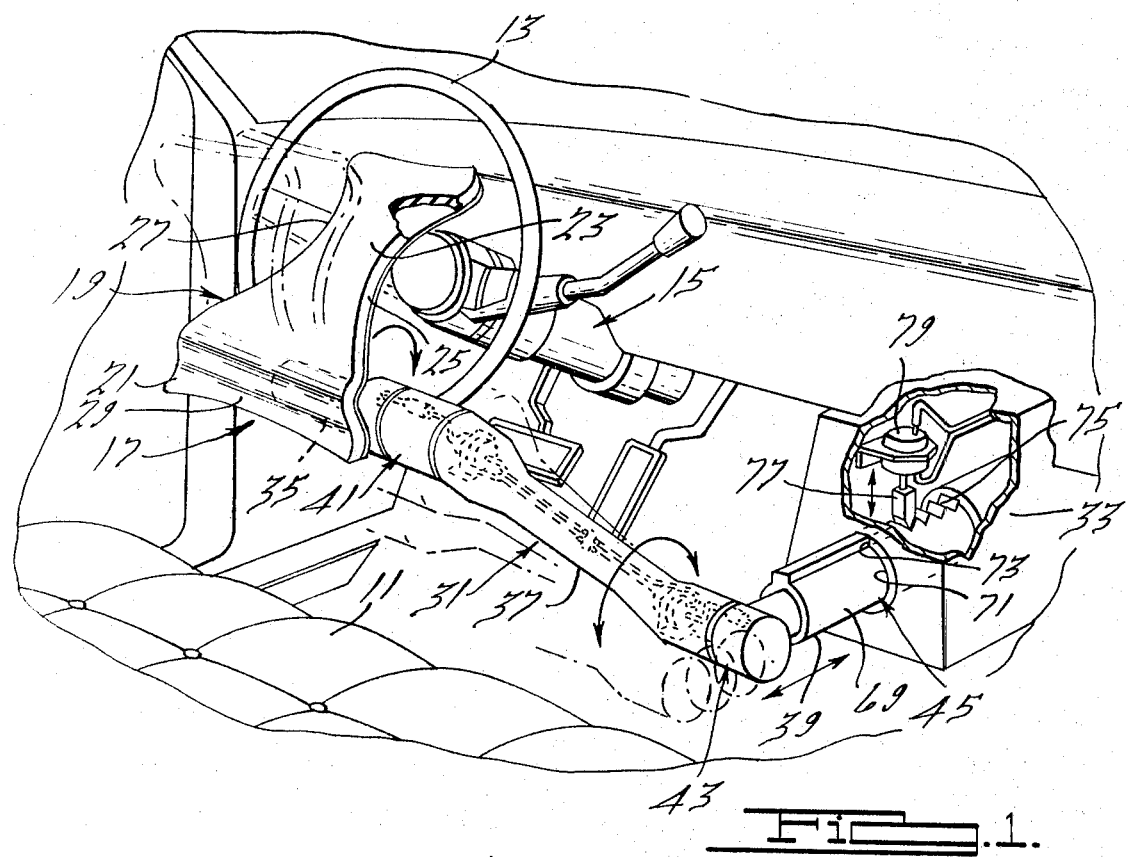
FIG. 1 of the drawings shows a perspective view of a vehicle restraint device constructed in accordance with this invention installed in front of the driver's seat in an automotive vehicle.

FIG. 1 of the drawings shows a portion of the interior passenger compartment of an automotive vehicle. A horizontal seat cushion 11 is positioned rearwardly of the vehicle steering wheel 13 and steering column 15. A passenger restraint assembly 17 includes a padded member 19 positioned between the steering wheel and the vehicle operator. The padded member includes a waist engagable portion 21 and a chest engagable portion 23 and may be constructed of rigidly backed foam rubber. The side peripheries 25 and 27 of the chest engagable portion are concave to provide accessibility to vehicle controls for the operator's arms. The maximum width of the entire padded member occurs at the waist engagable portion 21. The upper surface of the padded member may also be gently curved to slightly enclose or encircle the vehicle occupant.

An articulated support structure 31 interconnects the padded member 19 and a console 23 that is rigidly secured to the vehicle body forwardly of the seat 11. The support structure includes a horizontally and transversely extending upper section 35 secured to the padded member, a longitudinally extending intermediate section 37 and a lower section 39 joining the console 33. A first adjustable connection 41 joins the upper section 35 with the intermediate section 37 and permits relative movement about a horizontal transverse axis. A second connection 43 joins the lower section 39 with the intermediate section and permits relative movement about a second horizontal transverse axis. A third means of adjustment exists at the connection 45 of the lower section 39 and the console 33 where fore and aft or longitudinal movement of the lower section relative to the console is permitted.

Figure 2:
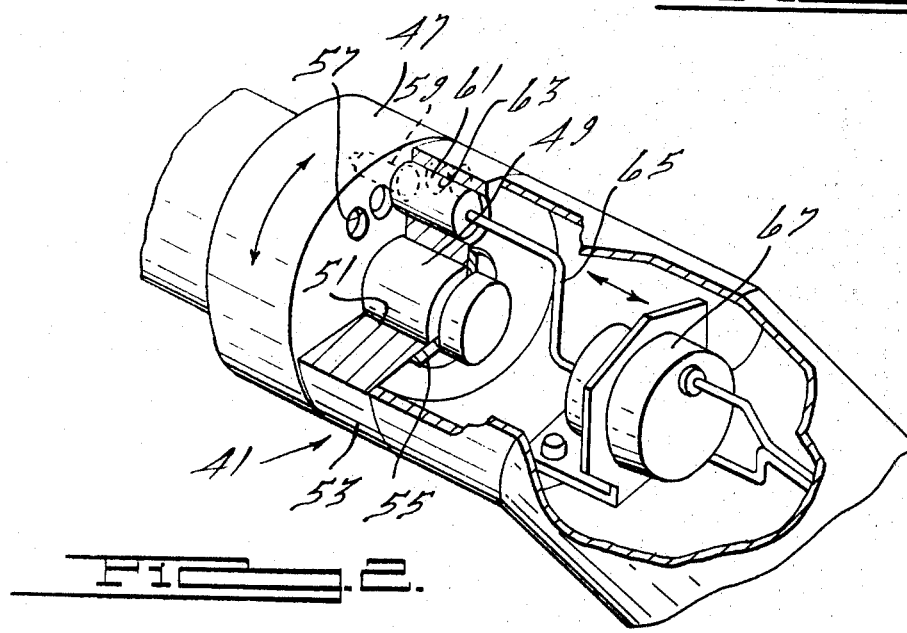
FIG. 2 is an enlarged perspective view, with a portion broken away, of one of the adjustment mechanisms shown in FIG. 1.

Connection 41 is shown in FIG. 2 of the drawings. Connection 43 is similar. The end member 47 of the upper section 35 has a stud 49 which is received in a corresponding bore 51 of the end member 53 of the intermediate section 37. A snap ring 55 or other suitable fastener holds the stud within the bore and permits relative rotational movement. A plurality of circumferentially spaced holes 57 are formed in member 47 adapted to receive the protruding shaft 59 of a piston 61 slidable within a bore 63 of end member 53. The piston is connected by a rod 65 to a vacuum motor 67, which can move the piston shaft 59 into or out of one of holes 57 to lock or release the connection 41 of the adjustable support structure 31.

Connection 45 is formed by a generally cylindrical portion 69 of the lower section 39 of the support structure 31 being slidably received with a corresponding bore 71 of the console 33. A slot 73 is formed in the bore 71 to accommodate a row of teeth 75 protruding from the cylindrical portion 69 and to prevent rotation of the lower section 39 relative to the console. A movable detent 77 is engagable with teeth 75 to lock the lower section in a given position relative to the console. A vacuum motor 79 moves the detent vertically to release the connection 45 and to permit fore and aft adjustment of the lower section 39 relative to the console 33.

The vacuum motors of the connection adjustment mechanisms obtain their vacuum from the automobile engine intake manifold in a conventional manner. The vacuum motors likewise may be of a conventional design in which vacuum off position is a spring biased position. In the connections described above the locked positions of the connections would be the spring biased or "vacuum-off" positions of the vacuum motors. It may be understood that electrical solenoids could be substituted for vacuum motors, if desired.

The vehicle operator upon entering into the vehicle seats himself on the seat 11 behind the steering wheel 13. The padded member 19 and its support structure 31 are positioned upwardly and forwardly as shown in FIG. 1 to provide maximum clearance for the entry of the occupant. After seating himself, the occupant engages a control means (not shown) which actuates one or more of the vacuum motors and releases one or more of the connections 41, 43 or 45. The pad 19 is then brought forwardly and downwardly so that the waist engagable portion 21 is adjacent the waist of the occupant and the chest engagable portion 23 is adjacent, but not contacting the chest of the occupant. A control means (not shown) is actuated causing the padded member to be locked in that selected position. The fore and aft adjustment of connection 45 need be made only when the position of the seat 11 is changed. It may be seen that during normal driving and operation of the vehicle, the padded member 19 is spaced apart from the occupant but would restrain his forward movement in the event of a sudden or unexpected stop or deceleration.

Modifications and alterations may occur to those skilled in the art which are included in the scope of the following claims.

I claim:

1. In an automotive vehicle having a body portion and a passenger seat attached to said body portion, a means to limit the forward displacement of a passenger comprising:
 a padded member having a first portion engagable with the chest of the passenger and a second portion engagable with the waist of the passenger,
 articulated means connecting the padded member to the body portion of the vehicle permitting adjustment of the position of the padded member and displacement of the padded member to facilitate entry into and egress from the passenger seat,
 said articulated means including
 a console secured to the body portion of said vehicle positioned forwardly to one side of the passenger,
 a lower section having a portion received by said console and being movable relative thereto in a fore and aft direction,
 an upper section secured to said padded member and extending laterally therefrom,
 an intermediate section interconnecting said upper and lower sections,
 first adjustable connecting means permitting said upper section to pivot about a horizontal transverse axis relative to said intermediate section,
 second adjustable connecting means permitting said intermediate section to pivot about a second horizontal transverse axis relative to said lower section, said above-mentioned sections and console providing a single cantilevered support for said padded member.

2. Means to limit forward displacement of an automotive vehicle passenger according to claim 1 and including:
 said padded member when viewed from the passenger seat having greater width top and bottom portions and a lesser width intermediate portion, the side peripheries of said padded member being inwardly contoured in a concave manner.

* * * * *